United States Patent [19]

Sorgatz et al.

[11] 4,033,642
[45] July 5, 1977

[54] SHAFT MOUNTING APPARATUS

[75] Inventors: Ulrich Sorgatz, Wolfsburg; Hans-Jurgen Kogge, Fallersleben, both of Germany

[73] Assignee: Volkswagenwerk Aktiengesellschaft, Germany

[22] Filed: Feb. 18, 1976

[21] Appl. No.: 659,114

[30] Foreign Application Priority Data

Feb. 20, 1975 Germany .......................... 2507253

[52] U.S. Cl. .................................. 308/26; 74/574; 308/184 R
[51] Int. Cl.² .......................................... F16C 27/00
[58] Field of Search ............ 308/15, 26, 28, 184 R; 74/574

[56] References Cited

UNITED STATES PATENTS

| 3,318,642 | 5/1967 | Peterson | 308/26 |
| 3,504,573 | 4/1970 | Yoshita | 74/574 |
| 3,601,459 | 8/1971 | Cutting | 308/26 |

FOREIGN PATENTS OR APPLICATIONS

| 1,187,500 | 1/1965 | Germany |
| 1,160,310 | 7/1964 | Germany |
| 308,344 | 4/1917 | Germany |
| 1,755,860 | 12/1961 | Germany |

*Primary Examiner*—Joseph F. Peters, Jr.
*Assistant Examiner*—Richard A. Bertsch
*Attorney, Agent, or Firm*—Brumbaugh, Graves, Donohue & Raymond

[57] ABSTRACT

A shaft mounting apparatus includes, in a preferred embodiment, in addition to a bearing, a resilient ring mounted between the shaft and a surface which is concentric to the shaft. The resilient ring adds additional stiffening to the shaft which shifts the resonant frequency of the shaft to a frequency above the frequency range at which the shaft is to operate.

8 Claims, 4 Drawing Figures

SHAFT MOUNTING APPARATUS

BACKGROUND OF THE INVENTION

This invention relates to shaft mounting devices and in particular to devices for inhibiting resonant oscillations of a shaft.

A shaft which extends or projects outward from its mounting bearing, or extends over a considerable distance between bearings has a natural resonant vibrational frequency which depends primarily on the length, mass and stiffness of the shaft in addition to the flexibility of the bearings in which the shaft is mounted. The tendency of a shaft to enter into resonant vibrations is enhanced when the shaft bearings have bearing play, that is the shaft may be radially vibrated with respect to the structure to which it is mounted by the bearing. When a shaft is excited to vibrate at a frequency which is at or near its natural vibrational frequency, or harmonics of its natural vibrational frequency, the amplitude of shaft vibration will be significantly increased causing unwanted operational noise and in severe cases damage to the bearings.

One prior art technique for suppressing vibrations in a shaft is disclosed in published German patent application 1,187,500. That application discloses vibration suppressing intermediate bearings in a curved drive shaft. The curvature of the drive shaft causes a shifting in the first mode resonant frequency of the drive shaft to a range higher than the anticipated revolution frequency of the shaft. Intermediate bearings are provided in the drive shaft at the point of maximum amplitude of vibration, to suppress vibrations of the second resonant mode. The intermediate bearings are supported within a tube containing the drive shaft by diametrically opposed rubber plugs. The operation of the rubber mounted intermediate support bearings is to directly suppress vibrations and not to affect the actual resonant frequency of the shaft in the second mode. The arrangement illustrated in the published application, while effective for the purpose disclosed, is not suitable for suppressing vibrations in an extended shaft, since the diametrically opposed rubber plugs suppress vibrations in only two radial directions.

A similar arrangement, wherein a bearing is mounted by resilient means is disclosed in German patent 1,160,310. The patent shows a bearing which is completely supported by resilient elements. Such a mounting while reducing the transmission of shaft vibrations to the structure on which the shaft is mounted does not alter the natural frequency of resonance of the shaft to reduce the amplitude of vibrations and consequently eliminate the source of vibrational noise and the possibility of excess bearing wear on account of shaft vibration. Also the structure disclosed does not effect the vibrational freedom resulting from bearing play.

It is therefore an object of the present invention to provide a shaft mounting which suppresses shaft vibrations.

It is a further object of the present invention to provide such a mounting which is economically constructed and easily assembled.

SUMMARY OF THE INVENTION

In accordance with the present invention there is provided an apparatus for mounting an extended shaft, having a selected range of frequencies and a natural resonant vibrational frequency, to a support structure. The apparatus includes at least one bearing between the structure and the shaft which has bearing play. Also included is a support collar on the structure and having an interior surface which is concentric to the shaft. Finally, there is provided means, permanently resilient in all radial directions, mounted between the shaft and the surface, for shifting the resonant frequency of the shaft to a frequency above the frequency range.

In accordance with a preferred embodiment of the invention the resilient means is a wear resistant ring mounted within the bearing, and the concentric surface is an extension of a bearing surface. The resilient ring may be a meander shaped flat metal ring, or a plastic ring having stiffening ring shaped inserts. Preferably there are two inserts having an ark shaped radial cross-section, which are arranged to face in opposite directions.

For a better understanding of the present invention together with other and further objects thereof, reference is had to the following description, taken in conjunction with the accompanying drawings and its scope will be pointed out in the appended claims.

DESCRIPTION OF THE INVENTION

Figure 1:
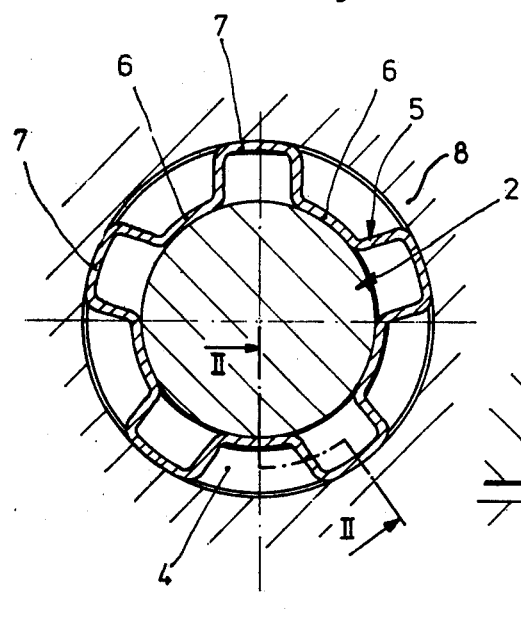
FIG. 1 is an axial cross-section of a shaft mounting apparatus in accordance with the present invention.
Figure 2:
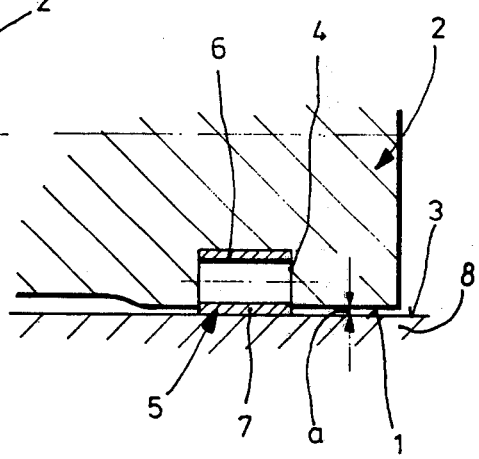
FIG. 2 is a radial cross-section of the shaft mounting apparatus illustrated in FIG. 1.

FIGS. 1 and 2 show respectively an axial and a radial cross-section of a shaft mounting apparatus in accordance with the present invention. In the illustrated embodiment a shaft 2 is mounted within a support structure 8 by a bearing comprising cylindrical bearing surfaces 1 and 3. Between surfaces 1 and 3 is a small gap, indicated by $a$, which causes the bearing to have a certain degree of bearing play. On account of this bearing play there may be an undesired inclination of shaft 2 to vibrate at its fundamental resonant frequency, or harmonics of its fundamental resonant frequency. A high amplitude of shaft vibration can therefore be anticipated if shaft 2 is rotated at a frequency which is the same or is close to one of the natural resonant frequencies of the shaft.

In order to inhibit such undesired oscillations there is provided in the embodiment of FIGS. 1 and 2 a radially resilient ring 5 between shaft 2 and circumferential interior surface 3 of support structure 8. As may be seen by the cross-sections in FIG. 1 and FIG. 2, ring 5 is formed of substantially flat material having a meander shaped construction. The material from which ring 5 is formed is resilient such as spring steel, so that radial pressure is applied between the surfaces 6 which are adjacent to shaft 2 and the surfaces 7 which are adjacent to support structure 8. In the embodiment shown in FIGS. 1 and 2 ring 5 is located within a groove 4 on shaft 2 and bears against an extension of the bearing surface 3 on support structure 8. Surfaces 6 and 7 of ring 5 are coated with an anti-friction material such as bronze or wear-resistant plastic, to prevent wear on the surfaces during rotation of the shaft over a long period of operation. The dimensions of radial ring 5 are chosen so that when installed as illustrated in FIGS. 1 and 2 the permanent radial resilience of ring 5 provides an appropriate radial rigidity for shifting the resonant frequency of shaft 2 to a frequency which is above the normal operating range of rotation for shaft 2. The radial resilience of ring 5 contributes only negligibly to the support of bearing forces, most of which are borne by bearing surfaces 1 and 3.

While the embodiment of FIGS. 1 and 2 has a resilient ring mounted as a part of the bearing structure itself, those skilled in the art will recognize that it is possible to mount resilient ring 5 at a location other than the bearing location. Likewise the surface which the resilient means bears against need not be an extension of the bearing surface of the mounting structure.

Figure 3:
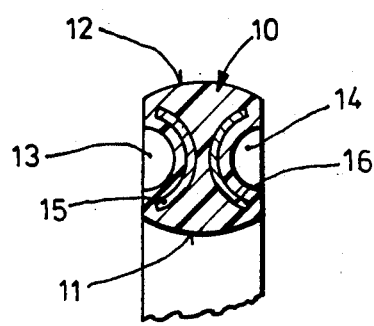
FIG. 3 is a radial cross-section of a resilient ring usable in the present invention.

Those skilled in the art will also recognize that structures other than meander shaped ring 5, illustrated in FIG. 1, may be used to provide a resilient ring. FIG. 3 shows a resilient ring which comprises a rotationally symmetric plastic body 10 within which there are provided annular inserts 15 and 16. Inserts 15 and 16 have an arc-shaped radial cross-section with the arcs facing away from each other to provide permanent radial resilience to ring 10. To further aid the resilience of ring 10 radial outer surface 12 and radial inner surface 11 are toroidal in shape. Likewise, there are provided toroidal channels 13 and 14 on the axial surfaces of ring 10.

Figure 4:
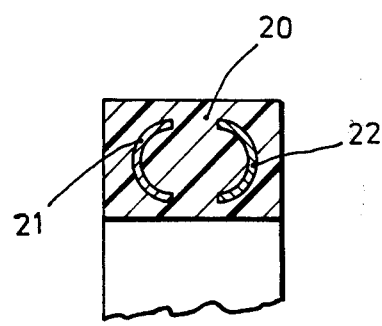
FIG. 4 is a radial cross-section of an alternate resilient ring usable in the present invention.

Radially resilient ring 20 which is illustrated in cross-section FIG. 4 has plain inner, outer, and axial surfaces and is provided with stiffening inserts 21 and 22, which are similar to insert 15 and 16 of ring 10. Ring inserts 21 and 22 are arranged with the arc openings adjacent to each other, as shown in the illustration, but nevertheless, provide the necessary permanent radial resilience to ring 20 which is essential to the operation of the present invention.

Whichever type of resilient ring is used, it is necessary to provide for expansion of the ring as the adjacent surfaces wear. Consequently, it is generally necessary to provide a radial slot in the meander-shaped ring 5 shown in FIG. 1 and also in the ring-shaped inserts 15, 16, 21, and 22 shown in FIGS. 3 and 4. The plastic rings used in FIGS. 3 and 4 should be provided with hollow spaces to allow for ring expansion upon wear of the sliding surfaces. These measures will ensure a permanence to the required radial resilience of the rings.

As an alternate to using the rings illustrated in FIGS. 1 through 4, it is possible to practice the present invention using springs which are circumferentially distributed around the shaft, preferentially at regular intervals.

The radial force caused by the resilient ring, or other means, between the shaft and the circumferentially surrounding support structure provide a coupling of vibrational forces from the shaft to the more rigid support structure. This resilient coupling of vibrational forces causes an upward shift in the natural resonant vibration frequency of the shaft. It is therefore possible, by appropriate selection of the radially resilient force applied by the ring, to shift the natural resonant frequency of the first mode of shaft vibrations to a frequency which is above the normal rotational frequency of the shaft. This shifting of the resonant frequency of the shaft will greatly reduce the tendency of the shaft to enter into high amplitude vibrations during rotation over its normal range of operating frequencies.

While that have been described what are believed to be the preferred embodiments of the invention, those skilled in the art will recognize that other and further modifications made be had thereto without departing from the true spirit of the invention, and it is intended to claim all such embodiments as fall within the true scope of the invention.

We claim:

1. An apparatus for mounting an extended shaft, having a selected range of operating frequencies and a natural resonant vibrational frequency, to a support structure, comprising:
   at least one bearing supporting said shaft arranged between said structure and said shaft, and having bearing play;
   a support collar, on said structure, having an interior surface concentric to said shaft;
   and means, permanently resilient in all radial directions, mounted between said shaft and said surface, for shifting the resonant frequency of said shaft to a frequency above said operating frequency range.

2. An apparatus as specified in claim 1 wherein said resilient frequency shift means is arranged near said bearing.

3. An apparatus as specified in claim 2 wherein said interior surface is an extension of a bearing surface of said bearing.

4. An apparatus as specified in claim 1 wherein said resonant frequency shifting means comprises a ring which is wear resistant on at least one of its radial surfaces.

5. An apparatus as specified in claim 4 wherein said ring comprises a meander-shaped ring of substantially flat material.

6. An apparatus as specified in claim 4 wherein said ring is a plastic ring having at least one stiffening, ring-shaped insert.

7. An apparatus as specified in claim 6 wherein said insert has an arc-shaped radial cross-section.

8. An apparatus as specified in claim 7 wherein there are provided more than one insert and the arcs of at least some of said inserts are arranged to face in opposite directions.

* * * * *